No. 826,524. PATENTED JULY 17, 1906.
A. D. PALMER.
AUTOMATIC SHUTTER FOR MOVING PICTURE MACHINES.
APPLICATION FILED JAN. 22, 1906.
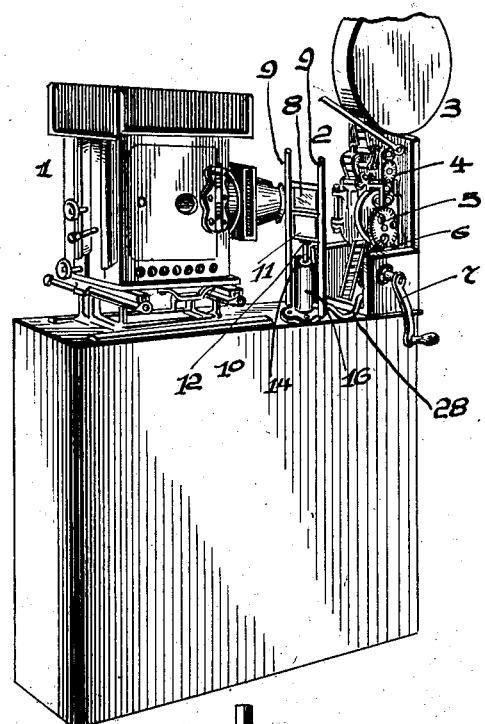
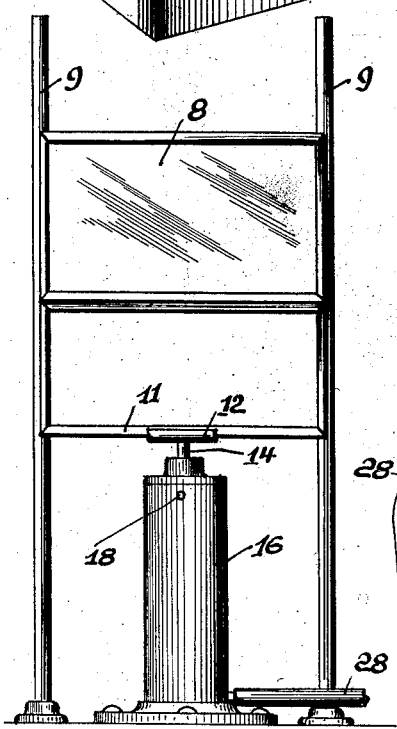
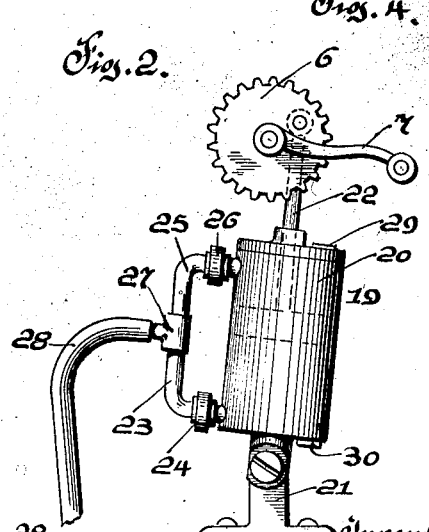
Witnesses:
Inventor.
Albert D. Palmer.
by Attorneys.

UNITED STATES PATENT OFFICE.

ALBERT D. PALMER, OF PITTSBURG, PENNSYLVANIA, ASSIGNOR TO FREDERICK INGERSOLL, OF PITTSBURG, PENNSYLVANIA.

AUTOMATIC SHUTTER FOR MOVING-PICTURE MACHINES.

No. 826,524.   Specification of Letters Patent.   Patented July 17, 1906.

Application filed January 22, 1906. Serial No. 297,197.

*To all whom it may concern:*

Be it known that I, ALBERT D. PALMER, a citizen of the United States of America, residing at Pittsburg, in the county of Allegheny and State of Pennsylvania, have invented certain new and useful Improvements in Automatic Shutters for Moving-Picture Machines, of which the following is a specification, reference being had therein to the accompanying drawings.

This invention relates to certain new and useful improvements in motion-picture machines; and the invention relates more particularly to a novel automatically-operated attachment adapted to be used in connection with machines of the above-described type.

The primary object of the invention is to provide an attachment which will fully protect the films of motion-picture machines from the heat generated by the lamp-housing of the stereopticon.

My invention aims to provide positive and reliable means for preventing the films used in connection with motion-picture machines from fusing or becoming heated when in operation from the lamp-housing of a motion-picture machine, thereby making a machine practically fireproof.

It is a well-known fact that numerous fires have occurred in theaters, auditoriums, and the like exhibit-halls from motion-picture machines and that inspection regulations of various cities have become so rigid that it is impossible to use an ordinary motion-picture machine unless the same is structurally fireproof or provided with numerous fireproof attachments. In the majority of instances the fires have occurred on account of the films of the machines becoming heated and ignited, and owing to the combustible material from which the films are made a destructive fire often occurs before the same can be extinguished, irrespective of the accidents and panics that might occur in large auditoriums or theaters.

To render the films of a motion-picture machine fireproof, I have devised a novel automatically-operated attachment, which is interposed between the lenses of a lantern and the films of the machine when said films are not being used. The attachment is constructed of a material which is fireproof and opaque, whereby the heat-rays projected from the magnifying-lenses of the lantern cannot affect and penetrate the films except when said films are in motion and the negatives of said films are being reproduced upon a suitable screen.

With the above and other objects in view, which will more readily appear as the nature of the invention is better understood, the same consists in the novel construction, combination, and arrangement of parts to be hereinafter more fully described and claimed, and referring to the drawings accompanying this application like numerals of reference designate corresponding parts throughout the several views, in which—

Figure 1 is a perspective view of a motion-picture machine equipped with my improved attachment. Fig. 2 is a front elevation of a fireproof screen used in connection with the same. Fig. 3 is a sectional view of a plunger used in connection with the screen, and Fig. 4 is a detail side elevation of a double-acting air-pump employed to automatically operate my improved screen.

In the accompanying drawings I have illustrated a conventional form of lantern 1, in front of which is mounted a motion-picture mechanism 2, consisting of a film-magazine 3, a film-moving device 4, which is actuated through the medium of pinions 5 and 6, and a crank-handle 7. The films as they are moved before the rays of light emitted from the lantern are projected upon a screen, the rapid movement of the films producing a motion and realistic picture.

My invention resides in mounting an opaque and infusible screen 8 in front of the lantern 1. The screen-frame 8 is slidably supported between two standards 9 9, mounted upon the base 10 of the machine. The screen-frame 8 has its lower edge provided with an open frame 11, which is attached to a cross-head 12, carried by a plunger 14. The plunger 14 is provided with a head 15, which is slidably mounted in a verticallly-disposed cylinder 16, carried by the base 10 beneath the frame 8. The head 15 of the plunger 14 is provided with a conventional form of ball-valve 16', adapted to close an opening or port 17, formed in the stem of the plunger 14. The cylinder at its upper end is provided with an exhaust-port 18.

Beneath the pinion 6 of the moving-film device I mount a double-acting air-pump 19, the cylinder 20 of said pump being pivotally mounted on a standard 21, carried by the base 10 of the machine. In the cylinder 20 is mounted a piston-head, which is connected to the pinion 6 by a piston-rod 22, and when the pinion 6 is rotated by the crank-handle 7 of the machine the cylinder 20 is rocked upon the standard 21 as the piston within the cylinder reciprocates. Extending out of the lower end of the cylinder 20 is a pipe 23, carrying a conventional form of check-valve 24. Another pipe 25 extends out of the upper end of the cylinder and has a check-valve 26. The pipes 23 and 25 are connected to a T 27, which in turn is connected by a tubing 28 with the lower end of the cylinder 16. The ends of the cylinder 20 are provided with check-valves 29 and 30, the object of which will presently appear. In operation while the film is being unwound from the magazine 3 through the medium of the crank-handle 7 the screen 8 is held in an elevated position, whereby the rays of light emitted from the lantern can pass through the frame 11 and penetrate the transparent film of the machine. Prior to this operation the frame 8 has been positioned whereby the opaque portion of the frame will be in alinement with the lenses of the lantern, but when elevated will not interfere with the rays of light being emitted from the lantern.

During the operation of the machine the frame 11 is maintained in an elevated position in alinement with the lenses of the lantern by the double-acting pump 19, which is simultaneously operated with the film-moving device of the machine. As the crank-handle 7 is rotated the double-acting pump 19 forces air through the tubing 28 and maintains a pressure upon the under side of the head 15, carried by the plunger 14, within the cylinder 16. The operation of the check-valves 24, 26, 29, and 30 in connection with the double-acting pump 19 is obvious, and in this connection I desire it to be understood that I may use another type of pump for normally maintaining a pressure in the cylinder 16 to retain the frame 11 in alinement with the lantern. When the operation of the machine has ceased, the ball-valve 16 permits of the air contained within the cylinder 16 exhausting through the port or opening 17 of the plunger.

From the foregoing it will be observed that I have devised novel means for normally maintaining an opaque screen in front of a lantern, also means for holding an open frame in alinement with the lantern when a machine is in operation. The movement of the screens is automatically controlled by the actuating crank-handle of the machine and does not necessitate a separate and independent operation, as has been necessary heretofore in connection with screens of this type.

I do not care to confine myself specifically to a reciprocating screen, as a movable screen of any other character may be substituted for the reciprocating screen herein described and operated by means of my improved mechanism.

Such changes in the construction and operation of my improved machine as are permissible by the appended claims may be resorted to without departing from the spirit and scope of the invention.

What I claim, and desire to secure by Letters Patent, is—

1. The combination with a lantern and a film-moving device, a crank-handle and pinions, said device being actuated by said pinions and said crank-handle, of a movable screen mounted between said lantern and said film-moving device, a portion of said screen being opaque, a cylinder mounted below said screen, a plunger mounted in said cylinder and connected with said screen, a valve located in said plunger, a double-acting pump mounted adjacent to said device and operated by one of said pinions and the crank-handle thereof, a tubing connecting said pump and said cylinder, substantially as described.

2. The combination with a motion-picture machine, of a screen mounted between the lantern and the film-moving device of said machine, a cylinder mounted below said screen, a plunger mounted in said cylinder and connected with said screen, a double-acting air-pump actuated by said film-moving device, a tubing connecting said air-pump and said cylinder, substantially as described.

3. The combination with a motion-picture machine having a lantern and a film-moving device, of a reciprocating screen mounted between said lantern and said film-moving device, an air-pump actuated by said film-moving device and adapted to move said screen, substantially as described.

4. The combination with a motion-picture machine consisting of a lantern and a film-moving device, of a screen interposed between said lantern and said device, a double-acting air-pump, simultaneously operated with said device, and means actuated by said air-pump to elevate said screen, substantially as described.

5. The combination with a motion-picture machine having a lantern and a film-moving device, of a screen interposed between said lantern and said device, a cylinder mounted beneath said screen, a plunger mounted in said cylinder and connected with said screen, means actuated by said film-moving device to raise said plunger, substantially as described.

6. The combination with a motion-picture machine having a lantern and a film-moving device, of a screen mounted in front of said lantern, a double-acting air-pump mounted adjacent to the device of said machine and operated by said device, means actuated by said pump to elevate said screen, substantially as described.

7. In a machine, the combination with a lantern and a film-moving device, of a screen, an air-pump, means to simultaneously actuate said pump and said device, and means actuated by said pump to move said screen, substantially as described.

8. The combination with a lantern and a film-moving device, of a screen interposed between said lantern and said device, an air-pump actuated by said device, means actuated by said air-pump to elevate said screen, and means to lower said screen at the cessation of the operation of said air-pump, substantially as described.

9. The combination with a lantern and a film-moving device, of a screen interposed between said lantern and said device, a cylinder mounted below said screen, a plunger mounted in said cylinder and connected with said screen, means actuated by said device to govern the movement of said plunger, substantially as described.

10. The combination with the film-moving device of a motion-picture machine, of a screen mounted adjacent to said device, an air-pump, means to simultaneously actuate said device and said air-pump, means actuated by said air-pump to raise said screen, substantially as described.

11. The combination with the lantern and the film-moving device of a motion-picture machine, said lantern emitting rays of light through the films of said device, of an air-pump, means to simultaneously actuate said pump and said device, and means actuated by said air pump to intercept the said rays of light of said lantern, substantially as described.

In testimony whereof I affix my signature in the presence of two witnesses.

ALBERT D. PALMER.

Witnesses:
E. E. POTTER,
H. C. EVERT.